June 6, 1939.  H. F. JOHNSTONE ET AL  2,161,056
PROCESS FOR RECOVERING SULPHUR DIOXIDE FROM WASTE GASES
Filed March 24, 1937
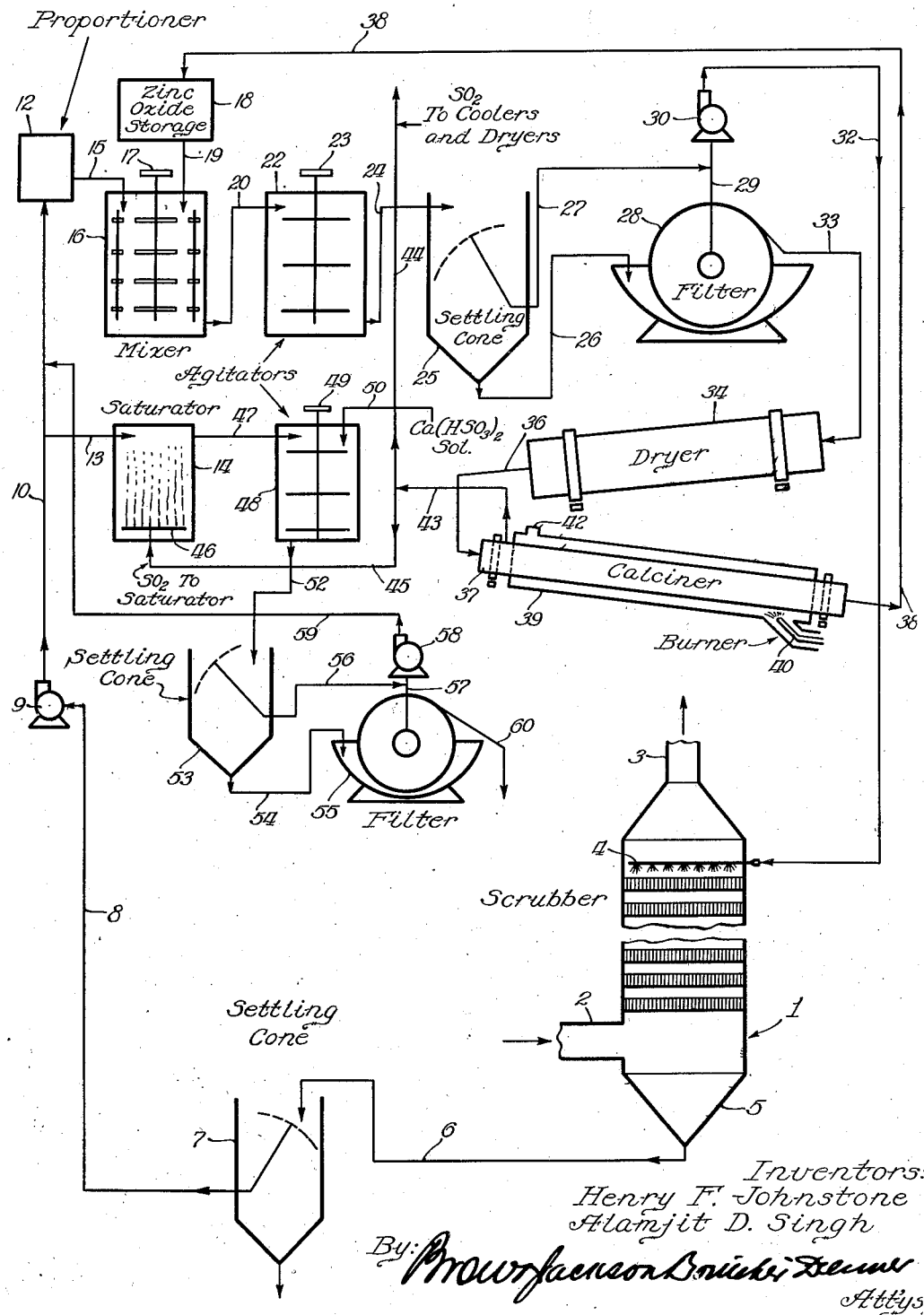
Inventors:
Henry F. Johnstone
Alamjit D. Singh
By: Brown, Jackson, Boettcher & Dienner
Attys Patented June 6, 1939

2,161,056

UNITED STATES PATENT OFFICE 2,161,056

PROCESS FOR RECOVERING SULPHUR DIOXIDE FROM WASTE GASES

Henry F. Johnstone and Alamjit D. Singh, Urbana, Ill., assignors, by mesne assignments, to Commonwealth Edison Company, Chicago, Ill., a corporation of Illinois Application March 24, 1937, Serial No. 132,692

5 Claims. (Cl. 23—178)

This invention relates to the removal of sulphur dioxide from waste gases, such as boiler furnace gases, smelter gases, and those from the chemical process industries, although its use is not limited to such gases, since it is equally applicable for use in the removal and recovery of sulphur dioxide from any gases containing this constituent.

This gas has become one of the most obnoxious and undesirable constituents of waste gases. It constitutes an annoyance on account of its pollution of the atmosphere in communities adjacent industrial centers. The commercial use of sulphur has threatened exhaustion of the world's sulphur supply and, inasmuch as the largest part of the industrial use of sulphur passes through the oxidation stage represented by the dioxide, the removal and recovery of the dioxide from waste gases and the like in industrial localities is economically advantageous.

In the practice of the present invention, we have been able to remove and recover pure sulphur dioxide gas from waste gases having, by volume, as low as 0.05% of this constituent present. The new process is especially useful, therefore, in recovering sulphur dioxide from gases having a low percentage of this constituent present, such as gases resulting from the combustion of coal, oil, or other sulphur bearing fuels, and waste industrial gases containing sulphur dioxide, although the gas may also be removed and recovered from smelter fumes and the like.

In considering the problem of removing sulphur dioxide from gases, several general systems have been employed. One of these comprises the washing of the gases containing sulphur dioxide with water, or with water containing an alkaline re-agent or other solvent, to recover the sulphur dioxide. This system has been improved upon, as disclosed in the Johnstone patent, No. 2,021,936, issued November 26, 1935, which is directed to the oxidation of the sulphur dioxide in the water to sulphuric acid, which then may be removed as desired. Another method comprises the chemical reduction of the sulphur dioxide to free sulphur, which has not, however, proved practical. As another expedient, various mechanical means have been attempted in order to remove and recover the sulphur dioxide from such gases, such as absorption on a porous material, or by compression of the gases, or refrigeration. At the present time, however, none of these processes appears to have solved the problem adequately, since in large scale operation the cost of using the processes is far greater than the value of the by-product recovered.

In the copending application of Henry F. Johnstone, Serial No. 665,337, filed April 10, 1933, now Patent 2,082,006 an improved process comprising the absorption, at a low temperature with respect to the process, of sulphur dioxide and an aqueous solution containing the salt of an acid having ionizing characteristics such that its ionization either decreases less than that of sulphurous acid with increasing temperature or, preferably, its ionization decreases with increase in temperature, is disclosed. In that application, there is disclosed the process in which ammonium sulphite is added to the washing solution, whereby upon the absorption of sulphur dioxide, the solution contains sulphite and bisulphite ions. The solution is thereafter heated and the reaction is reversed, liberating the absorbed sulphur dioxide. However, there are certain requirements in the use of the process as disclosed in said copending application which the present application is intended to overcome and to produce an improved method of removing and recovering the sulphur dioxide from the waste gases. In the process of recovering sulphur dioxide from waste gases by the absorption of the gas in a solution containing a soluble sulphite and bisulphite and the releasing of the gas by heating the solution, the limitation is definitely the small extent to which the dissolved sulphur dioxide can be removed from the solution without excessively increasing the heat required for the regeneration. In the case of ammonium sulphite-bisulphite solutions, the stripping of the sulphur dioxide from the solution cannot be carried beyond a certain ratio of sulphite to bisulphite even by using large quantities of heat, or steam, owing to the volatility of ammonia over solutions of ammonium sulphite at high temperatures. It is apparent also that regeneration by heating must always depend on vaporization of the sulphur dioxide and, therefore, some small equilibrium vapor pressure of sulphur dioxide must remain over the regenerated solution. When this solution is cooled before returning to the scrubber, the vapor pressure of sulphur dioxide is lowered, but it still remains finite. The waste gases leaving the scrubber in contact with the entering solution consequently cannot be completely denuded of the sulphur dioxide. Regeneration by heating, therefore, cannot be used for gases containing only a few parts per million of sulphur dioxide.

It is an object of the present invention to provide a solvent for absorbing the sulphur dioxide which will readily absorb the gas without producing an insoluble precipitate in the scrubber. In connection with this step of the process, a second object comprises the removing of the dissolved sulphur dioxide from a solution of a sulphite and a bisulphite, thereby increasing the alkalinity of the solution.

The substitution of a chemical process of regeneration of the sulphite-bisulphite solution for the heating process disclosed in the copending Johnstone application would remove these disadvantages inherent in the latter process and would, in turn, have the following advantages:

1. Faster rate of absorption of the sulphur dioxide from the waste gases due to the greater absorption gradient between the gases and the absorbent.
2. More efficient removal of the sulphur dioxide from the gases.
3. The possibility of use of the process on more dilute gases.
4. Obviation of the necessity for saturating the solution with sulphur dioxide as nearly as possible in order to regenerate economically.
5. The maintenance of strict proportionality between the cost of regeneration and the amount of sulphur dioxide recovered.
6. The possibility of advantageous use of sodium sulphite-bisulphite solutions over the ammonium solutions, thus reducing the cost of wastage losses.

In carrying out the process disclosed in the present application, we contemplate the use of a metallic oxide for the chemical regeneration of the sodium sulphite-bisulphite absorbing solution, and the recovery of this oxide and the absorbed sulphur dioxide, whereby the absorbing solution can be regenerated without the disadvantages attendant upon the regeneration and liberation in former processes.

Various objects and advantages of the improved process of the present invention over the previous processes will appear more fully from the following detailed description, which, taken in conjunction with the accompanying drawing, will disclose to those skilled in the art the particular operation and results attendant upon use of a preferred embodiment of our invention.

The single figure of the drawing illustrates the specific application of the process to the removal and recovery of sulphur dioxide from boiler flue gases, and is intended to represent diagrammatically a flow sheet for the present process.

Considering the flow sheet in detail, there is provided a scrubber or washing tower 1, provided with a suitable gas inlet 2 which may be connected to receive stack gases from boilers or the like, and which is provided with a gas outlet 3 through which the gases are exhausted from the scrubber. A suitable series of nozzles or other discharge devices for the absorbing solution is disposed adjacent the upper end of the scrubber, as indicated at 4, and at the lower end of the scrubber there is provided a hopper or sump 5 in which the solution, together with the impurities and solids washed out of the gas stream, collects.

In employing the process, we first scrub the waste gases in the scrubber 1 with an aqueous solution of sodium sulphite and bisulphite introduced into the upper end of the scrubber and discharged in countercurrent direction with respect to the flow of gases entering the gas inlet 2 and being exhausted through the outlet 3. Preferably the scrubber is provided with a suitable checkerwork or packing, as may be desired, in order to provide intimate contact between the absorbing solution and the gases. After the solution is collected in the sump 5, the collected solution, with the suspended solids therein, is removed through the line 6 into a settling cone 7, in which cone the suspended solids are precipitated from the solution, and are withdrawn in any suitable manner. The absorbed sulphur dioxide of the solution, which exists in the solution as an increased ratio of bisulphite to sulphite, is removed from the settling cone 7 through the line 8 and the force pump 9 to a suitable proportioner 12 connected to the pump 9 through the conduit 10.

From the proportioner 12, the solution containing the absorbed sulphur dioxide is discharged through the conduit 15 into a suitable mixer 16 which contains rotating paddles or agitating members diagrammatically indicated at 17, where the solution is intimately mixed with a solid metallic oxide capable of forming an insoluble or slightly soluble sulphite. This oxide is added to the solution from a storage container 18 through a suitable line 19, and agitation is provided to promote the rapid dissolution of the oxide in the mixer 16. The solution is then conducted from the lower end of the mixer 16 through the line 20 into the upper end of an agitator 22 having agitating elements driven from the shaft 23, where formation and growth of the sulphite crystals are promoted, and the mixture is discharged through the line 24 to a settling device 25, in which the greater portion of the insoluble sulphite is removed from the lower end thereof through the line 26 to a filter member 28.

The clear supernatant liquor, now having the original ratio of sulphite to bisulphite, is withdrawn from the settling cone 25 through the line 27 to the pump 30, and from this pump is returned through the conduit 32 to the discharge nozzles 4 in the scrubber 1 for further absorption of sulphur dioxide.

It will be apparent that this part of the process, therefore, operates in a cyclic manner, there being no consumption of the absorbing agent other than possible evaporation of water in the scrubber due to the heat of the waste gases, which can be made up or supplied at any point in the cycle by the addition of make-up water. Incidental losses of solution by spray or leak may also be made up by addition of the alkaline absorbing agent, in the preferred embodiment of the invention, this being sodium sulphite and bisulphite. For example, either sodium carbonate, or sodium hydroxide may be added to the solution. Either of these is immediately converted to sodium sulphite by the sulphur dioxide absorbed from the gases.

Returning now to the precipitated metallic sulphite settling in the cone 25, this may either be withdrawn from the process and discarded, if only the removal of sulphur dioxide from the waste gases is considered, or may be saved as a valuable product, or if desired, and preferably, this precipitate is treated to recover the original metallic oxide in another cyclic procedure.

If the non-cyclic process is chosen, lime may be used as the oxide, in which case calcium sulphite is the insoluble material precipitated from the scrubbing solution. Because of the difficulty of recovering lime from the precipitated sulphite, however, zinc or magnesium oxide are preferred if the cyclic procedure for recovery of the metallic oxide is to be employed.

Starting with the precipitated slurry or sludge in the settling cone 25, the cyclic procedure consists of filtering and washing the solids on a continuous filter device 28 of known form, the filtrate from this device being returned through the line 29 to the pump 30 and thence being mixed with the clear supernatant absorbing solution from the cone 25, the two absorbing solutions being united at the pump 30 and returned through the line 32 to the scrubber 1. The solids from the filter 28 are dried in a drier 34, connected to the filter 28 through the line 33, and after being dried in the unit 34, the dried solid is transmitted through the line 36 to a calciner indicated generally at 37. In this calciner, the solid is subjected to indirect heat within a drum 39 by a gas fed burner 40 or the like, the calcination producing the metallic oxides and liberated sulphur dioxide. The details of this phase of the process are disclosed in the copending application of Alamjit D. Singh, Serial No. 148,074, filed June 14, 1937.

The liberated sulphur dioxide is conducted through the line 43 to suitable coolers and driers through the line 44, and may be then subjected to compression or the like in order to liquefy the same for producing the valuable by-product of the process.

The oxide recovered in the calciner 37 is returned through the line 38 to the storage compartment 18, from which it is again metered out through the line 19 into the mixer 16 in contact with the saturated absorbent solution from the proportioner 12.

The use of sodium sulphite solutions for absorbing sulphur dioxide is generally known, as is also the use of lime suspension for removing the absorbed sulphur dioxide as a precipitate. However, the use of a metallic oxide for regenerating the sodium sulphite solution in the manner described is believed novel, especially when the oxide itself which is used for the regenerating phase of the absorption solution can also be subjected to a cyclic process whereby it is regenerated for further use.

Considering the process in connection with the use of lime for regeneration of the sodium sulphite solution, a particularly important novel feature resides in the obviation of the necessity of circulating suspensions of solids through the scrubber, which is a difficult operation because of the tendency of the solids to adhere to the scrubbing surfaces and clog the scrubber. Yet the net result of the process is the same as if the lime were sent directly to the scrubber, that is, the sulphur dioxide is removed from the gases by indirect action with lime.

Thus it will be seen that the present invention contemplates the removal of sulphur dioxide from flue gases by the use of an absorbing solution free from any suspended or partially precipitated solids which would tend to destroy the efficiency of the scrubbing operation, and yet lime is employed for removing the absorbed sulphur dioxide from the absorbing solution. This is distinctly different from the direct treatment of the flue gases with a lime suspension in the scrubber, which soon results in inefficient scrubbing action due to the clogging action of the solids.

When lime is used for regenerating the absorbent, the material is of course consumed, since it is impracticable to attempt to recover the sulphur dioxide from the lime suspension. Since the regenerating medium is consumed, a quantity equivalent to the sulphur dioxide removed from the waste gases must be supplied. For the production of pure sulphur dioxide by the process, it is desirable, therefore, to use in place of the lime a metallic oxide of which the dry sulphite is unstable upon heating. Of these, zinc and magnesium sulphites are examples which may be employed. Because of the lower decomposition temperature of the sulphite and the smaller tendency to form side products, we find that the use of zinc oxide as a regenerating medium is preferred.

As an example of the action of zinc oxide on a solution containing sodium sulphite and bisulphite, one of the tests which we conducted gave the following results:

The original solution coming from the scrubber contained 2.97 mols of sodium ions per 100 mols of water, and the molar solution ratio of sulphur dioxide to sodium was 0.915. The solution, therefore, was mostly in the bisulphite form. By the addition of zinc oxide in a molar ratio of 0.35 to dissolved sulphur dioxide, the ratio of sulphur dioxide to sodium in the solution was reduced to 0.615, and the ratio of sulphur dioxide removed to zinc oxide added was 1.0. The decrease in the acidity of the solution represented by the increase in the pH was from 5.06 to 6.41. The solution, therefore, was restored to the more alkaline condition with the higher ratio of sulphite to bisulphite and was suitable for scrubbing gases containing sulphur dioxide.

In another example, representing a continuous operation of the scrubbing cycle, gases containing approximately 0.18% sulphur dioxide were scrubbed with a solution of sodium sulphite and bisulphite containing 1.25 mols of sodium ions per 100 mols of water. The gases were flowing through the scrubber at the rate of 300 cubic feet per minute and the solution at the rate of 12.2 pounds per minute. The flow of gas and solution were countercurrent. The ratio of dissolved sulphur dioxide to sodium in the solution entering the scrubber was maintained at 0.60 by the addition of zinc oxide in amounts equivalent to that of the sulphur dioxide absorbed. The efficiency of sulphur dioxide absorption under such conditions varied between 95 and 99%.

We have found that the composition and concentration of the scrubbing solution may be varied at will and chosen to best fit the particular gas and type of scrubber employed. In general, the best results appear to be obtained when the ratio of sulphur dioxide to sodium in the regenerating solution entering the scrubber is not allowed to fall below 0.6. On the other hand, in order to keep the scrubber operating at its highest efficiency, the same ratio in the solution leaving the scrubber must not be allowed to rise above 0.9. By knowing the quantity of solution required for wetting the scrubber surfaces and the quantity and composition of gas to be scrubbed, the concentration of the solution may be readily determined.

While the flow sheet illustrates the use of zinc oxide in the regeneration of the absorbing solution, as we have stated lime or magnesium oxide may be employed for application to the solutions of sodium sulphite and bisulphite. We recognize, however, that any other metallic oxide of a class capable of forming an insoluble or slightly soluble sulphite that decomposes with heating may be employed in the process. Examples of this class are the oxides of barium, strontium, lead, and cadium. Furthermore, the scrubbing solution may contain the sulphite and bisulphite of other ions than sodium, such as lithium, potassium, and ammonium.

In the operation of the process as thus far described, it may happen that a small portion of the sulphite present in the scrubbing solution is converted to the sulphate by oxidation. Sulphate may also accumulate in the solution from other sources, such as by absorption of sulphuric acid from the waste gases simultaneously with the absorption of the sulphur dioxide. Since in some cases, such as when zinc oxide is used, the sulphite is preferentially removed from the solution by the precipitating agent, the net effect is an accumulation of sodium sulphate in the solution with a resulting decrease in the sodium concentration available for forming the sulphite and bisulphite. It is therefore desirable that some process of removing the sulphate be employed, in order to increase the sodium concentration or to restore the same in order to provide a proper quantity of sulphite and bisulphite ions.

We have found that this removal can be accomplished easily by withdrawing through the line 13 a portion of the scrubbing solution leaving the settling cone 7. This portion of the scrubbing solution, which has been partially saturated with the sulphur dioxide absorbed in the scrubber 1 from the waste gases, can be completely saturated with a portion of the sulphur dioxide coming from the calciner 37 through the line 43 and the line 45. A suitable saturator 14 is provided, the sulphur dioxide from the line 45 being sprayed through the discharge means 46 within the saturator 14 into the solution entering through the line 13, to produce an acidity of the absorbing solution such that calcium sulphite will not be precipitated. From the saturator 14, the acidified solution is transmitted through the line 47 into an agitator 48, containing the rotating agitating means 49. In this agitator, the acidified solution is contacted with a concentrated solution of calcium bisulphite through the line 50, which may be introduced from any suitable source. This produces a precipitation of calcium sulphate, which is removed from the solution by passing the mixture of calcium bisulphite and acidified absorbing solution through the line 52 into a settling cone 53. The precipitate of calcium sulphate is removed in the cone 53 and is transmitted through the line 54 to the filter 55, where it is washed and drained away through the line 60. The clear liquor or desulphated solution is returned from the settling cone 53 through the line 56, and from the filter 55 through the line 57 to a return pump 58 which is connected through the line 59 with the main conduit 10 leading from the scrubber to the proportioner 12.

While the process of sulphate removal as a side phase of the process has been described in detail, it is to be understood that other bisulphites may be employed for this purpose. For example, barium bisulphite may be substituted for calcium bisulphite in this phase of the process and will accomplish removal of the accumulated sulphates in the absorbing solution, in order to maintain the sodium concentration at the proper point to provide sufficient sulphite and bisulphite ions for proper interaction with the waste gases.

This process of removing the sulphate from the sulphite-bisulphite solution employed in absorbing sulphur dioxide from the waste gases has been described generally in the copending Johnstone application, Serial No. 665,337 now patent 2,082,006. However, in the instant case, the calcium or barium bisulphite solution is added to the saturated solution rather than the adding of lime or calcium carbonate and subsequent saturation of the solution by sulphur dioxide.

In the process as thus disclosed, the following chemical reactions take place in the various portions of the cycle:

In the scrubber:

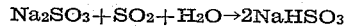
$$Na_2SO_3 + SO_2 + H_2O \rightarrow 2NaHSO_3$$

In the sulphate removal:

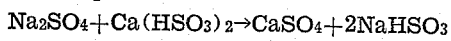
$$Na_2SO_4 + Ca(HSO_3)_2 \rightarrow CaSO_4 + 2NaHSO_3$$

In the regenerator:

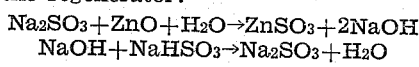
$$Na_2SO_3 + ZnO + H_2O \rightarrow ZnSO_3 + 2NaOH$$
$$NaOH + NaHSO_3 \rightarrow Na_2SO_3 + H_2O$$

In the calciner:

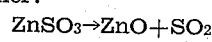
$$ZnSO_3 \rightarrow ZnO + SO_2$$

It is believed apparent that, by the present process, we have provided an efficient and economical manner of removing and recovering sulphur dioxide from waste gases, such as stack gases, smelter gases and waste gases from the chemical process industries. By the use of the present process, the absorbing solution is maintained at a substantially constant concentration, rendering the efficiency of absorption substantially constant throughout the process. Further, it will be noted that the process involves two subprocesses, each of which is cyclic in operation. Thus, the absorbing solution, after being saturated with the $SO_2$ from the waste gases, is regenerated by the addition of a metallic oxide thereto, which precipitates sulphite crystals and restores the absorbing solution for return in a regenerated condition to the scrubber for further contact with the waste gases. The metallic oxide itself is precipitated as a sulphite, and is then subjected to drying and heating to decompose the same into the metallic oxide and the free sulphur dioxide, which may be removed and collected in any suitable manner, such as by being cooled and compressed to liquefy the same. The regenerated metallic oxide is returned to a suitable storage chamber for recontact with the absorbing solution to regenerate this solution. As a side step in the process, we employ the use of calcium or barium bisulphite for removing accumulated sulphates in the absorbing solution, in order to maintain the sodium concentration at the proper point to provide sufficient sulphite and bisulphite ions for proper interaction with the waste gases to absorb the sulphur dioxide.

We are aware that various modifications and changes may be made in the process described and illustrated herein, without departing from the essential features of the present invention, and we therefore do not intend to be limited except as disclosed and defined in the appended claims.

We claim:

1. The process of recovering sulphur dioxide from dilute sulphur dioxide gases which consists of absorbing the sulphur dioxide in an aqueous solution of sodium sulphite and bisulphite, treating the enriched solution with zinc oxide, removing the precipitated zinc sulphite from the solution, returning the solution to contact with the gases in a cyclic manner, drying the zinc sulphite, heating the zinc sulphite to decomposition into zinc oxide and sulphur dioxide, collecting the sulphur dioxide, and returning the zinc oxide for further treatment of the enriched solution.

2. The process of removing sulphur dioxide from an aqueous solution containing sodium sulphite and sodium bisulphite which consists of adding zinc oxide to precipitate zinc sulphite, removing the precipitated zinc sulphite, drying the zinc sulphite, heating the dry sulphite to decomposition into the zinc oxide and sulphur dioxide, and returning the zinc oxide for treatment of the said sulphite solution, in a cyclic manner.

3. The process of removing sulphur dioxide from dilute sulphur dioxide gases, which comprises: absorbing the sulphur dioxide in an aqueous solution containing a sulphite and a bisulphite, treating the enriched absorbing solution with zinc oxide to form zinc sulphite, removing the zinc sulphite from the sulphite and bisulphite solution, returning the solution for recontact with the gases, drying the zinc sulphite, heating the zinc sulphite to decompose the same into zinc oxide and sulphur dioxide, and returning the zinc oxide for treatment of the absorbing solution in a cyclic manner.

4. The continuous process of removing and recovering sulphur dioxide from dilute sulphur dioxide gases, which comprises: absorbing the sulphur dioxide in an aqueous solution containing sodium sulphite, sodium bisulphite, and sulphate, separating a portion of the enriched absorbing solution, saturating said portion with sulphur dioxide gas, treating the saturated solution with calcium bisulphite solution, separating the precipitated calcium sulphate from the treated portion of said solution, combining said portion with the main solution, treating the entire solution with zinc oxide, removing the precipitated zinc sulphite from the solution, returning the solution for recontact with the gases, drying the zinc sulphite, heating the zinc sulphite to decomposition into zinc oxide and sulphur dioxide, collecting the sulphur dioxide, and returning the zinc oxide for further treatment of the entire solution.

5. The continuous process of removing sulphate and sulphur dioxide from an aqueous solution containing a sulphite, a bisulphite and a sulphate, which comprises: contacting a portion of said solution with sulphur dioxide to saturate the same, treating said saturated portion of the solution with calcium bisulphite, separating the precipitated calcium sulphate from said portion of said solution, returning the balance of said portion of said solution to the main solution, adding to the entire solution zinc oxide to precipitate zinc sulphite, removing the precipitated zinc sulphite, drying the zinc sulphite, heating the dried zinc sulphite to decomposition into zinc oxide and sulphur dioxide, and returning said zinc oxide for treatment of said entire solution.

HENRY F. JOHNSTONE.
ALAMJIT D. SINGH.